B. W. HARRIS.
Hand-Seeder.
No. 129,279. Patented July 16, 1872.
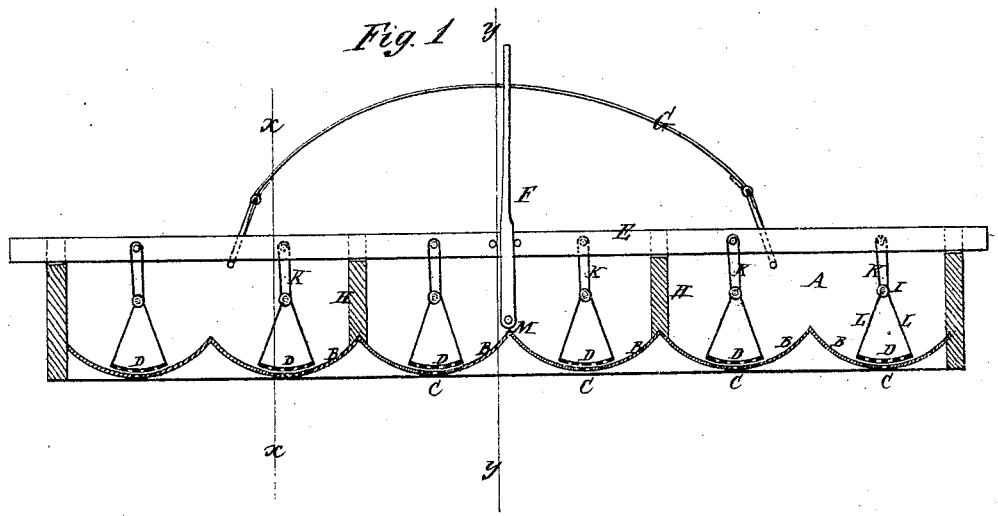
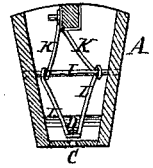
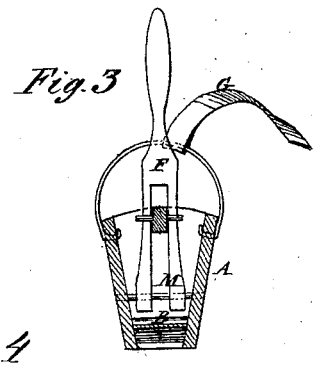
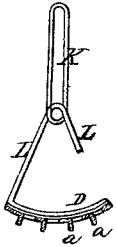
Witnesses:
A. W. Almqvist
N. A. Graham
Inventor:
B. W. Harris
per
Attorneys.

UNITED STATES PATENT OFFICE.

BARTON W. HARRIS, OF WILLIAMSPORT, OHIO.

IMPROVEMENT IN HAND SEEDERS.

Specification forming part of Letters Patent No. 129,279, dated July 16, 1872.

Specification describing a new and Improved Seeder, invented by BARTON W. HARRIS, of Williamsport, in the county of Pickaway and State of Ohio.

My invention comprises a long light trough with a strap or cord adapted for being suspended from the shoulders of the sower, and to be carried by him, the bottom of the trough being divided in its lengthwise direction into several short concave sections with a feed-hole at the bottom, covered by a curved oscillating gate with holes for the seed to fall through and projections for pushing away any objects too large to pass through the holes in the bottom of the trough, which said gates swing on pivots and have arms extending above the pivots to a reciprocating bar at the top of the trough, extending the whole length of it, and worked by a hand-lever at the center, all as hereinafter described.

Figure 1 is a longitudinal sectional elevation of my improved seeder. Fig. 2 is a transverse section taken on the line $x\ x$ of Fig. 1. Fig. 3 is a transverse section taken on the line $y\ y$. Fig. 4 is a section of one of the gates, showing the peculiar construction of them.

Similar letters of reference indicate corresponding parts.

A represents the trough; B, the concave sections of the bottom; C, the seed-holes; D, the perforated gates; E, the reciprocating bar; F, the hand-lever for working the said bar; G, the strap for suspending the trough from the shoulders of the sower; and H partitions in the trough for separating the grain equally. The gates are pivoted at I on a radius equal to that of the curve of the sections B, and above said pivots they are connected to the reciprocating bar by stems K in such manner as to be swung by it in the lengthwise direction of the trough. The said gates have several holes through which the grain falls to the concave bottoms to be carried along to the holes C and delivered through them. Said gates, which swing a little above the bottoms B, also have projections $a$ (see Fig. 4) on the under side, which brush away any objects too large to pass through said holes C. They are suspended from the pivots by small wires L, one to each end, which work in the grain easily, so that but little power is required to work them. The grain falls down the concave bottoms naturally to the gates. The hand-lever, pivoted at the lower end to the bottom at the junction of the two middle sections, is shown at M, and the free end rises up in front of the operator, where it is most convenient to work it by the hands, being connected to the reciprocating bar a short distance above the pivot.

Having thus described my invention, I claim as new and desire to secure by Letters Patent—

1. The trough A with perforated concave bottom sections, the curved vibrating perforated gates D, reciprocating bar E, and hand-lever F, combined and arranged substantially as specified.

2. The said gates, provided with the projections $a$ on the under side, substantially as specified.

BARTON WILLIAM HARRIS.

Witnesses:
GEORGE W. HURST,
J. D. ANDREW.